INVENTOR.
LEONARD C. DOZIER
BY Allan Rothenberg
ATTORNEY

Nov. 2, 1965    L. C. DOZIER    3,214,983
ATTITUDE REFERENCE
Filed April 11, 1960    3 Sheets-Sheet 3

INVENTOR.
LEONARD C. DOZIER

BY *Allan Rothenberg*

ATTORNEY

United States Patent Office
3,214,983
Patented Nov. 2, 1965

3,214,983
ATTITUDE REFERENCE
Leonard C. Dozier, Whittier, Calif., assignor to
North American Aviation, Inc.
Filed Apr. 11, 1960, Ser. No. 21,187
17 Claims. (Cl. 74—5.34)

This invention relates to an attitude reference for use as a precision heading reference, and particularly concerns such apparatus which provides a comparably precise Schuler-tuned vertical reference.

The increasing use of Doppler navigation equipment in transport and tanker-type aircraft has generated a pressing need for a higher precision directional reference in order to take advantage of the accuracy potential of the Doppler equipment itself.

In addition to the need for a better directional reference for operation with Doppler, the trend to higher aircraft speeds is continually accentuating the difficulties encountered during accelerating flight with conventional vertical reference gyros using in-flight bubble erection. For example, during the long period of acceleration up to cruising speed immediately after takeoff of a jet transport, the bubble erection system associated with its vertical gyro causes the indicated vertical to tip forward by 5 or 6 degrees in pitch. It is possible that some jet aircraft may be literally flown into the ground because the pilot begins to rely on his gyro pitch reference too soon after takeoff under instrument conditions.

In the past, the accuracy of the gyro-magnetic compass has not been a serious limitation to the achievable navigation accuracy of long range aircraft. This is because the uncertainty in the wind has been so much greater that it has been principally responsible for, by far, the greatest portion of errors in long range dead reckoning navigation. As Doppler radar equipment has come into use, the limitation due to lack of knowledge of the wind has been removed. It is now possible to measure distance traveled over water with an accuracy ranging from 1% down to about 0.5% using Doppler equipment of a type suitable for transport-type aircraft. The difficulty is that even under favorable circumstances (operations below 60° latitude) the better gyro-magnetic compasses contribute an error of the order of 1° in the direction of the flight path. This corresponds to a lateral distance error of 1.75% of distance traveled, which is two to four times greater than the errors inherently achievable by the Doppler radar. The situation is far worse in operations above approximately 60° latitude due to the close approach to the magnetic pole. In addition, achievement of the 1° accuracy in the lower latitudes requires very careful correction for magnetic deviation and, even then, is still subject to uncertainties of several degrees during magnetic storms.

For the provision of suitably low azimuth drift rate of a directional gyro, there is required a relatively precise vertical reference to maintain the azimuth gyro accurately level. It is not sufficient merely to maintain the spin axis of the gyro in the level plane. It is necessary to maintain the axis of the torquer which introduces horizontal component of precission in an accurate vertical attitude. It is the absence of stabilization of such a torquer in the conventional single gyro directional reference which limits its accuracy even though the gyro itself may be perfectly drift free. It is not unusual for such a torquer to be as much as 3° off level due to variations in angle of attack of the aircraft. In the lower latitudes, such an error in level would lead to a steady error of about 1° per hour in the rate compensation applied to the azimuth gyro. Thus, a simple and precise vertical reference is required for a precision azimuth reference.

Accordingly, it is an object of this invention to provide an angular reference for indicating azimuth, pitch and roll of an aircraft in the simplest possible manner and which will maintain its accuracy during sustained acceleration maneuvers.

In carrying out the invention in accordance with a preferred embodiment thereof, an accurate vertical reference is provided by the use of a mechanically Schuler-tuned vertical gyro having an unbalanced and vertically disposed spin axis, together with a novel method of correcting for acceleration induced offset of the gyro from the local vertical. There is provided a gimballed platform which is constrained to follow the Schuler-tuned vertical gyro mounted thereon and a follow up gimbal, or pair of gimbals, which is or are constrained to follow up the platform with an angular offset, or offsets, proportional to a known amount (a function of velocity) by which the Schuler-tuned gyro is out of level. Since the platform which is constrained to the gyro partakes of the vertical offset of the gyro, the follow-up gimbals are most conveniently stabilized accurately to the local vertical by introducing the computed offset into the servo loops which cause the gimbals to follow up the platform. With two such follow-up gimbals thus accurately leveled, an azimuth or directional gyro may be conveniently mounted thereon and thus maintained accurately level.

It is an object of this invention to minimize the effects of sustained velocity changes on a gyro attitude reference.

A further object of the invention is to provide an improved means of correcting a Schuler-tuned pendulous gyro.

Another object is to accurately level a directional gyro.

Still another object of the invention is to provide an accurate vertical reference without use of precision linear accelerometers, high-quality integrators or precision gyro torquers.

These and other objects of the invention will become apparent from the following description taken in connection with the accompanying drawings in which.

Figure 4:
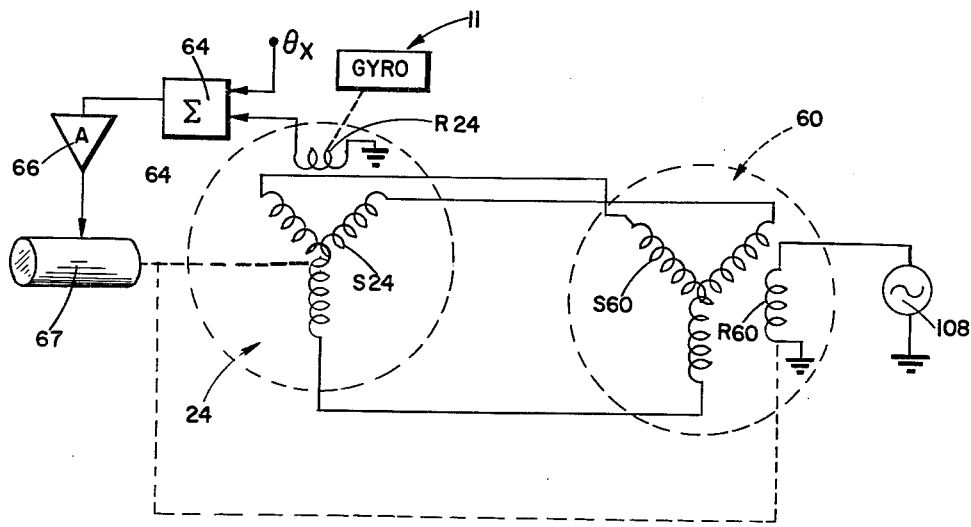

And FIG. 4 illustrates an exemplary synchro system.

In the drawings, like reference characters refer to like parts.

Figure 1:
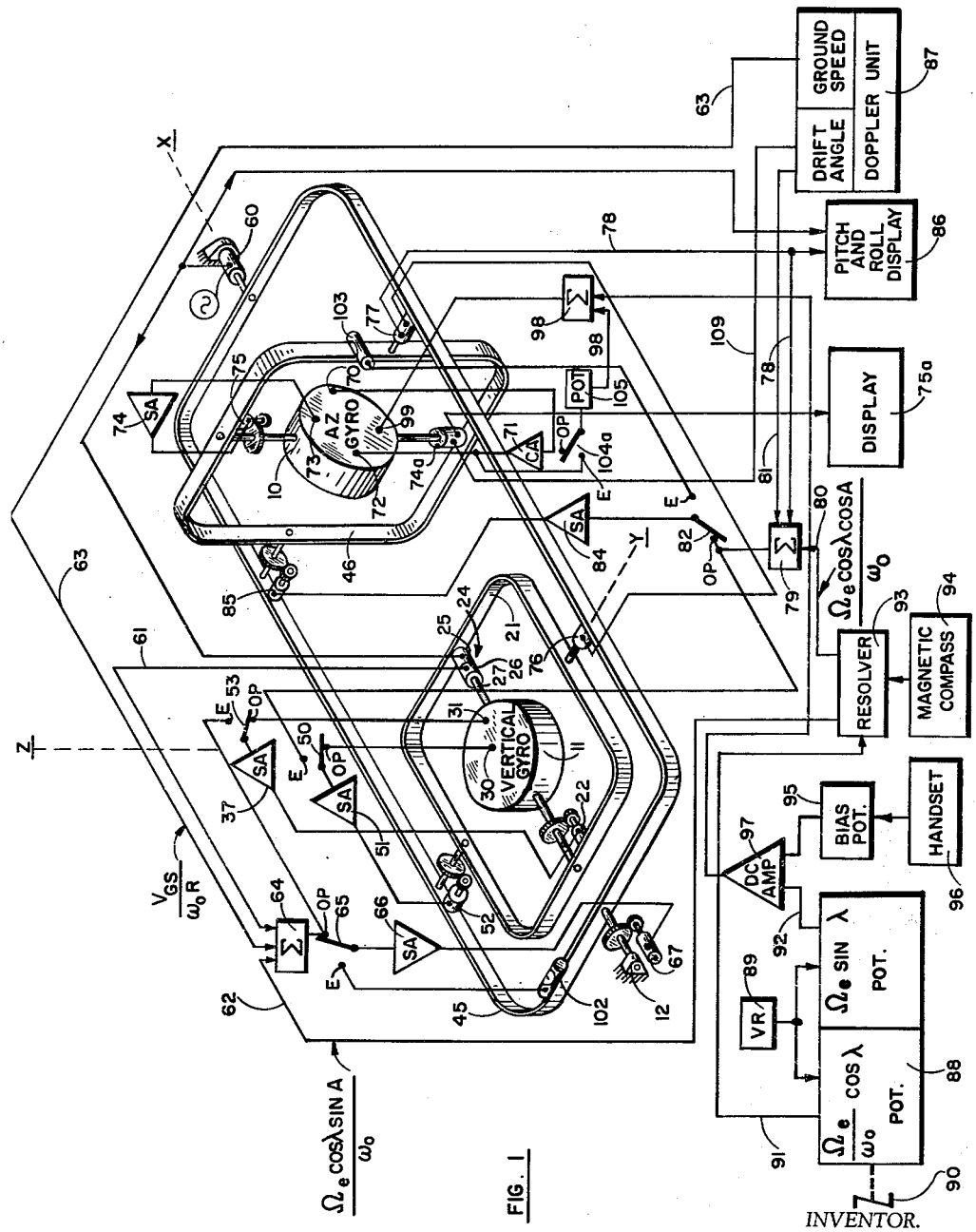
FIG. 1 is an illustration of an all attitude reference system constructed in accordance with the principles of this invention.

Illustrated in FIG. 1 is an all attitude reference comprising a sectional stable platform substantially similar in overall configuration to the platform described in the co-pending application of John M. Slater, Serial No. 695,869, filed November 12, 1957, for "Sectional Stable Platform." The platform utilizes an azimuth platform section 10 and a vertical platform section 11 which are mounted to the airframe or some suitable support fixed thereto by means of a gimballing arrangement to be described. As will become apparent, the vertical platform section is actually a quasi-vertical section since it is slaved to a pendulous vertical gyro. In order to better comprehend the ensuing description of the system, reference is made to FIG. 2 which illustrates the vertical platform and one of its gimbals.

Vertical platform 11 comprises the outer case of a two-axis or free gyro. A spherical hermetically-sealed rotor case 13 mounts a shaft 14, carrying a rotor 15 on ball bearings 16 and centrally located drive motor 17. Rotor case 13 is mounted by bearings 18 in a gimbal ring 19 which is supported relative to the outer spherical case 11 (the gyro stabilized vertical platform section) by bearings 20. The outer case 11 is supported for rotation about axis X which is the roll axis of the apparatus and of the aircraft in the configuration and orientation of the illustration. This X axis rotation is relative to a gimbal mounting ring 21 which constitutes one of the gimbals of the vertical platform section illustrated in FIG. 1. The rotation axis X is provided with a servo motor 22 which drives outer case 11 via gearing 23. Also mounted on the X axis is a conventional synchro 24 having a stator 25 fixed to ring 21 and a rotor 26 fixed to shaft 27 which in turn is secured to the outer case 11.

The gyro has substantially similar pickoffs 30 and 31 for detecting precession or tilt about the Y and X axes respectively between rotor case 13 and outer case 11. The two pickoffs are identical except for orientation and location. Pickoff 31, for example, comprises a fixed A.-C. excited field structure including cores 32, 33 fixed to case 11 and having a series wound coil thereon excited from an A.-C. source 34. A flat coil 35 is fixed by means of a rigid arm 36 to the pivot of rotor case 13 for rotation therewith about the X axis between the cores 32 and 33. The output of the coil 35 is fed to an amplifier 37. If D.-C. servo motors are to be used in connection with and driven from the output of the pickoffs, the amplifier 37 will include a demodulator phase-referenced from the source 34. Alternatively, A.-C. servo motors may be utilized and the demodulator omitted.

In order to physically limit precession of the rotor relative to its gimbal mounting, gimbal ring 19 may be provided with pin 40 which cooperates with a depression 41 in rotor case 13 to limit X axis precession. A similar pin and slot arrangement between outer case 11 and gimbal 19 (not shown) will be provided to limit Y axis precession.

The vertical gyroscope is mechanically Schuler-tuned. Its axis, the axis of shaft 14, is maintained substantially vertical and the rotor is provided with an unbalance as is indicated by the displaced mass portion 42 of the rotor which is symmetrical about the vertical spin axis (Z) but is arranged so that the center of gravity of the rotor lies below the center of its gimballed support so as to cause the gyro to have the desired period of oscillation. This unbalance Schuler-tunes the gyro as described in the U.S. patent to Schuler, No. 1,480,637, so that the gyro has a natural period of 84.4 minutes in the presence of horizontal acceleration. The displaced center of gravity of the gyro will generate a reaction torque around an axis which is mutually perpendicular to the spin axis and the acceleration vector at a rate proportional to the magnitude of the acceleration vector. As a result, after the vehicle carrying the instrument has accelerated up to a constant cruising speed, the gyro spin axis will have developed a tilt relative to the local vertical around the vehicle velocity vector which is proportional to the magnitude of the velocity vector with respect to inertial space. The resulting angular tilt of the gyro spin axis permits gravity acting on the rotor center of gravity to apply a gravity torque to the gyro around the velocity vector as an axis. Since the degree of gyro unbalance has been properly chosen for Schuler tuning, the result is that the spin axis of the gyro will precess in the direction of travel of the gyro at exactly the same rate as the gyro is moving around the center of the earth. Thus, the spin axis of the vertical gyro is maintained in a known orientation relative to the vertical at all times. The amount of tilt relative to the vertical is approximately 3/8 of a degree per 100 knots. It should be noted that when operating properly, the tilt is proportional to the "inertial velocity" rather than merely the ground speed. The inertial velocity is equal to the vector sum of the earth's velocity relative to fixed space and the motion of the vehicle relative to the earth (ground speed). Thus, the maximum value of this angle will be attained when an aircraft is flying east at the equator. The tilt angle corresponding to this condition for an aircraft flying at Mach 1 is approximately 5 degrees. It is necessary to compensate for this tilt angle when slaving the azimuth gyro to the vertical gyro.

The corrections can be computed with respect to the platform axes in terms of aircraft latitude, aircraft heading relative to North and aircraft ground speed. Drift angle should be included in the computation for greatest accuracy although elimination of this factor from the correction quantity will create but a small degradation in accuracy of the vertical which will be tolerable in many cases. In the following equations, the terms are defined as follows:

X axis=in a horizontal plane and along the horizontal projection of aircraft longitudinal (roll) axis
Y axis=in a horizontal plane and along the horizontal projection of aircraft transverse (pitch) axis
$\theta_x$=offset angle required between inner roll of vertical gyro and outer gimbal
$\theta_y$=offset angle required between inner pitch of azimuth gyro and outer gimbal
$V_{GS}$=aircraft ground speed
$R$=earth radius of curvature
$\Omega_e$=earth rotation rate
$\lambda$=latitude angle
$D$=drift angle as measured by Doppler radar, assumed to be a small angle in the equations
$A$=angle between X axis and true north (as measured by magnetic compass plus known declination from true north)
$\omega_o$=Schuler frequency=$\sqrt{g/R}$ The roll offset $\theta_x$ is defined as:

$$\theta_x = \frac{\Omega_e \cos \lambda \sin A}{\omega_o} + \frac{V_{GS}}{\omega_o R} \qquad (1)$$

and the pitch offset $\theta_y$ is defined as:

$$\theta_y = \frac{\Omega_e \cos \lambda \cos A}{\omega_o} + \frac{V_{GS} D}{\omega_o R} \qquad (2)$$

If the drift angle D is small, the second term on the right of Equation 2 can be completely omitted with but a relatively small increase in error.

The directional gyro may be substantially identical to the illustrated vertical gyro without the spin axis unbalance of its rotor. The spin axis of the directional gyro is maintained horizontal. It is the direction of the spin axis of the azimuth gyro, of course, which establishes the azimuth reference.

Figure 2:
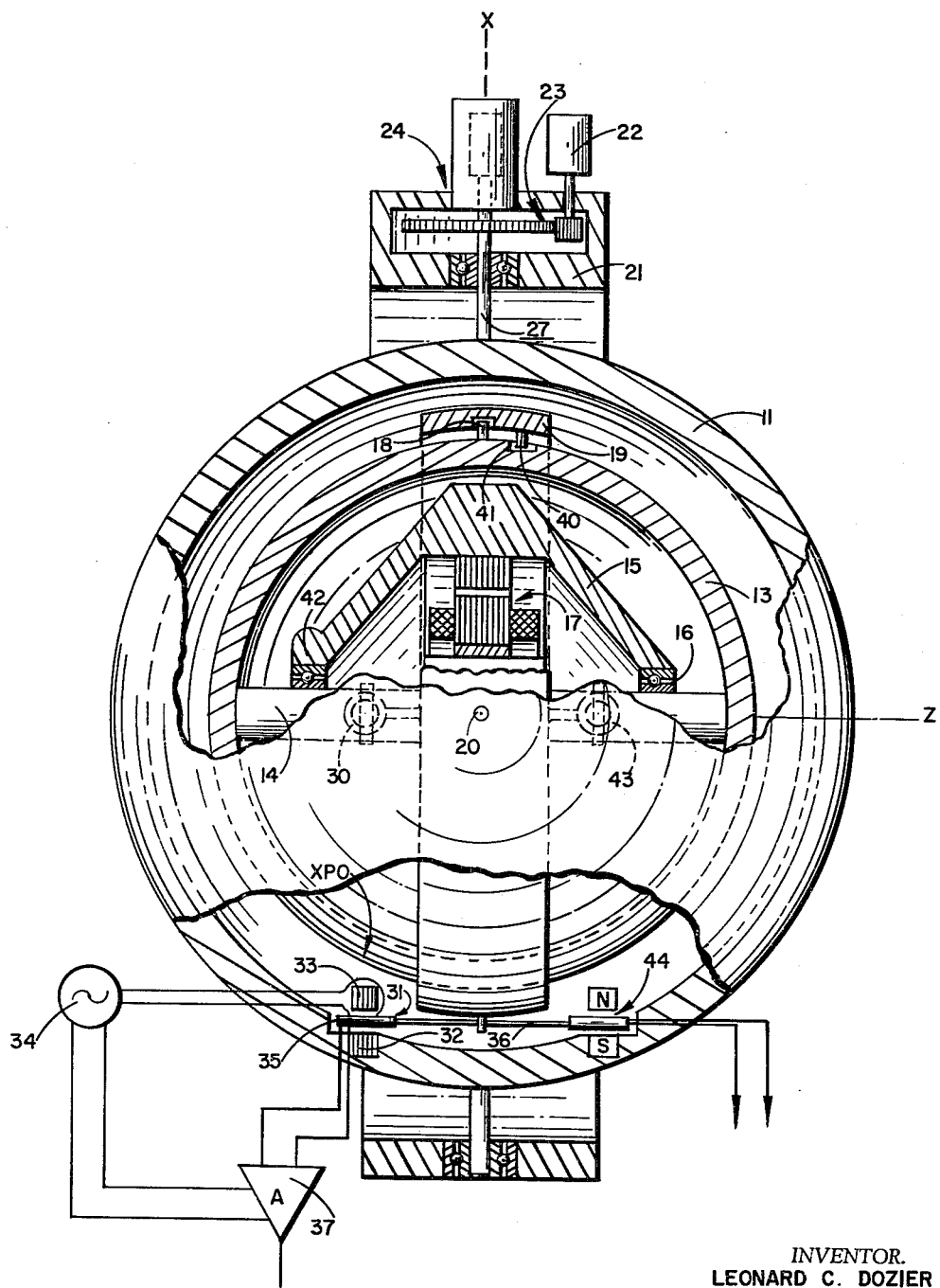
FIG. 2 illustrates a typical gyro and one of its gimbal mountings.

For purposes of correcting the vertical component of earth rate and for slaving the gyro to its case about one of its axes, the azimuth gyro is provided with a pair of torquers 43 and 44, illustrated in FIG. 2. It is to be understood, of course, that the torquers are not provided nor are they required for the vertical gyroscope.

The vertical platform section 11 is gimballed about two mutually orthogonal axes, roll and pitch, by means of gimbal ring 21. The platform is mounted for pivotal motion in roll to the gimbal ring 21 which in turn is mounted for pivotal motion in pitch to a roll follow-up gimbal 45. The roll follow-up gimbal 45 which is common to both the azimuth and vertical platform sections is pivoted to an airframe fixed support 12 along the roll axis.

The azimuth gyro platform section is mounted for pivotal motion about three mutually orthogonal axes, being pivoted in azimuth to a pitch gimbal ring 46 which in turn is pivoted about the pitch axis of the aircraft to the common roll gimbal 45. The pitch gimbal ring 46 is a second follow-up gimbal since, as will be presently described, it is slaved to follow the pitch attitude of the vertical platform section with a selected offset.

In normal operation, the platform 11 is slaved to the displaced vertical provided by its gyro in both roll and pitch. The follow-up roll gimbal 45 is slaved to the vertical platform section with a computed offset necessary to correct for the roll component of displacement of the vertical gyro from the local vertical. The follow-up pitch gimbal 46 of the azimuth gyro is slaved in pitch to the vertical gyro platform with the required pitch offset. Thus, while the vertical gyro platform section provides a reference which is not truly vertical, its offset is computed and utilized to slave the follow-up gimbal 46 to the true local vertical to a degree within the accuracy of the correction and linearity of the follow-up system. Therefore, the azimuth gyro which is mounted in pitch and roll by means of gimbals 46 and 45 is accurately leveled.

The Y axis pickoff 30 of the vertical gyro detects relative motion between the gyro and its outer case about the Y axis and feeds a signal through a switch 50 (in its illustrated operating position) and through a servo amplifier 51 to a servo motor 52. Servo motor 52, mounted on gimbal ring 45, thus rotates gimbal 21, together with case 11, about the pitch axis in an amount and in a sense sufficient to null the detected pitch deviation.

Similarly, the X axis pickoff 31 senses roll angle deviation of the gyro relative to its case and feeds a signal through a switch 53 and servo amplifier 37 to servo motor 22, which rotates the gyro case 11 relative to gimbal 21 to slave the platform section in roll to the gyro.

The first follow-up roll gimbal 45 is caused to follow up the roll position of the vertical platform section with the computed roll offset $\theta_x$ as defined in Equation 1. A synchro 60, having its rotor secured to gimbal 45 and its stator secured to the airframe provides a three-phase signal to energize the synchro 24 on gimbal 21. A second input to synchro 24 is in the form of a shaft rotation provided by the relative roll deviation of the platform 11 with respect to its gimbal 21 which is, of course, physically slaved to the roll follow-up gimbal 45. Thus, synchro 24 provides at an output lead 61 a signal indicative of the roll deviation of the platform 11 relative to gimbal 45. This signal on lead 61 is combined with first and second offset correction components on leads 62 and 63 which are respectively representative of the first and second terms on the right-hand side of Equation 1. The three signals on leads 61, 62, 63 are combined in summing network 64, having an output which feeds through a switch 65 and a servo amplifier 66 to an outer gimbal roll servo motor 67 which rotates gimbal 45 in roll relative to the airframe. It will be seen that the signal to the roll servo motor 67 has been augmented by the computed offset $\theta_x$ whereby the gimbal 45 will be maintained at an angle with respect to the vertical reference of platform section 11 which is proportional to the roll offset component.

The azimuth gyro need provide but one axis of stabilization. However, a two-axis gyro is utilized for simplicity of production. Since the azimuth gyro illustrated has two sensitive axes, one of its axes is redundant and the gyro is therefore slaved about one axis to its case 10. To this end the gyro's X axis pickoff 70 feeds a signal through a caging amplifier 71 to the gyro's Z-axis torquer 72 which torques the gyro to cause precession about X axis in a sense to slave the gyro to its case 10. The case of the azimuth gyro is slaved to the gyro in azimuth by means of the Z-axis pickoff 73 which feeds a signal through a servo amplifier 74 to a servo motor 75 which rotates the case relative to gimbal 46 in a sense to null the detected Z-axis deviation. Heading reference is provided by a synchro 74a having its stator fixed to gimbal 46 and its rotor fixed to the azimuth platform 10 so as to provide an azimuth indication to a suitable display device 75a.

Roll levelling of the azimuth platform section 10 is accomplished by the previously-described levelling of the common roll gimbal 45. Roll attitude of the latter is transmitted to the azimuth platform section 10 via the gimbal ring 46.

Pitch levelling of the azimuth platform section is accomplished through control of the pitch gimbal 46 which is caused to follow the pitch attitude of the vertical gyro with the required pitch offset $\theta_y$. Pitch attitude of the vertical gyro platform section 11, together with its gimbal 21, is sensed by a synchro 76 which has its stator mounted to gimbal ring 45 and its rotor secured to gimbal ring 21. The output of this synchro 76 is utilized to energize the stator of a synchro 77 having its stator fixed to gimbal 45 and its rotor fixed to the follow-up gimbal 46 of the azimuth platform section. The output of synchro 77 on lead 78 thus indicates the difference in pitch attitude between the two platform sections. To this error signal on lead 78 is added the computed pitch offset $\theta_y$. The combination of the offset angle with the error signal is achieved in a summing network 79 which combines the signals on lead 78 with the signal on leads 80 and 81 proportional respectively to the first and second terms on the right-hand side of Equation 2. The output of summing network 79 is fed via a switch 82 and a servo amplifier 84 to a servo motor 85 which is mounted on roll gimbal 45 and connected to rotate the pitch gimbal 46 in accordance with the input thereto. Thus, the pitch follow-up gimbal 46 is caused to follow the vertical gyro platform section 11 in pitch with an offset substantially proportional to the computed pitch offset $\theta_y$ of the mechanically Schuler-tuned vertical gyro.

For pitch and roll attitude display, a suitable indicator 86 is provided to accept the pitch and roll outputs of synchros 77 and 60 respectively.

For the computation of pitch and roll offset, there is required but a periodic setting of latitude, a magnetic compass and an indication of ground speed. Where a Doppler unit 87 is provided on the aircraft to be navigated, the second term on the right of Equation 2 and the second term on the right of Equation 1 will be available from suitably scaled Doppler outputs on leads 81 and 63 respectively. However, as indicated above, the omission of the drift angle from the computation may be tolerated if a decrease in accuracy is acceptable. In such a case, the Doppler unit is replaced with a conventional airspeed indicator utilized to provide an output suitably scaled to provide the quantity $$\frac{V_{gs}}{\omega_o R}$$

There is provided a conventional sine-cosine potentiometer 88, energized from a voltage reference source 89 and having a manually-controlled input by means of a knob 90 indicative of latitude $\lambda$. With suitable scaling, the output of the potentiometer on lead 91 is $$\frac{\Omega_e \cos \lambda}{\omega_o}$$

and the output of the sine portion of the potentiometer on lead 92 will be $\Omega_e \sin \lambda$ (the term $\Omega_e$ being proportional to the constant earth rate). The cosine output of the sine-cosine potentiometer 88 is fed to a resolver 93 which is operated by a magnetic compass 94 to provide multiplication by the quantity sine A. The output of resolver 93 on lead 62 thus is proportional to the first term on the left of Equation 1.

On output lead 80, resolver 93 provides a cosine component, multiplying its input on lead 91 by the quantity cosine A. Thus lead 80 provides a signal proportional to the first term on the right of Equation 2 which is one component of the required pitch offset correction $\theta_y$.

In the absence of a precession torque, the directional gyro will have an apparent rotation in azimuth caused by the vertical component of earth rotation. For this reason, the gyro is torqued about its X axis by an amount proportional to the quantity $\Omega_e$ sine $\lambda$. To this computed vertical component of earth rate must be added a bias which is required for correction of bias drift in the control of the azimuth gyro. This bias is normally adjusted during ground checks, but once set is not required to be varied in flight. Thus, a bias provided by a potentiometer 95 under manual control 96 is summed with the $\Omega_e$ sine $\lambda$ output of the sine cosine potentiometer 88 and fed through a D.-C. amplifier 97 and through a summing network 98 to the X axis torquer 99 of the directional gyro.

Figure 3:
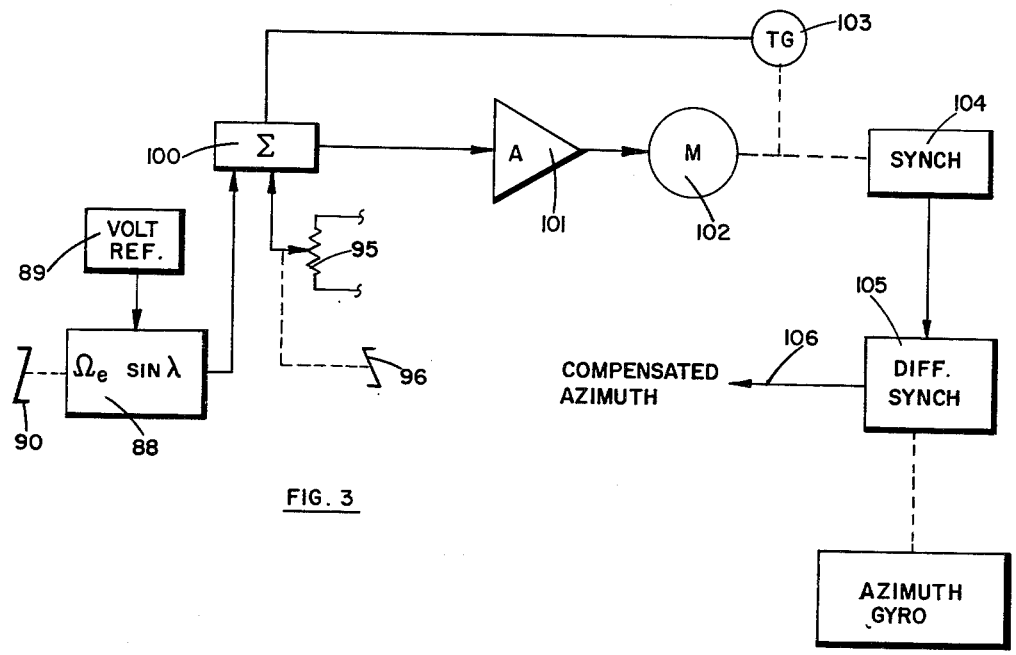
FIG. 3 illustrates an alternative arrangement for compensating the directional gyro for the vertical component of earth rate.

An alternative means of providing compensation of the vertical component of eath rate is illustrated in FIG. 3 and comprises the use of a differential synchro driven by a rate or integrating servo to subtract out the vertical component of earth rate before presentation of the azimuth reference to the other equipment. As illustrated in FIG. 3, the latitude set control 90 operates the sine-cosine potentiometer 88 to provide the earth rate component which is summed in summing network 100 together with the output of the bias potentiometer 95. The output of the summing network 100 feeds a servo amplifier 101 which drives a motor 102 having a tachometer generator 103 which provides velocity feedback as an additional input to the summing network 100 as in a conventional rate or integrating servo. The motor output thus runs at a rate proportional to the magnitude of the input and is utilized to drive a synchro 104 which energizes the stator of a differential synchro 105 in accordance with the rate compensation signal provided by the rate servo. The differential synchro is utilized in the place of synchro 74a, illustrated in FIG. 1, and has its stator and rotor respectively fixed to the gimbal 46 and azimuth platform section 10. Thus, the output of the differential synchro on lead 106 is the true azimuth heading compensated for earth rate despite the fact that the azimuth gyro is in error by the drift due to the vertical component of earth rate.

In normal use, the platform is initially levelled by any suitable vertical reference such as the gravity sensitive levels 102 and 103, while the azimuth platform section is aligned by automatic gyro-compassing which will move the azimuth gyro to a position accurately indicating true north. Prior to takeoff, and in order to initially erect the system, all switches 65, 53, 50, 82, and 104a are simultaneously thrown to the erect position. It is noted that all switches are illustrated in operate position. In the erect mode, the follow-up gimbals are levelled to the local vertical as sensed by the electrolytic bubble levels 102, 103, and the vertical gyro and its platform section are slaved to this local level with the required offset.

A conventional gravity-sensitive bubble level 102 is secured to the roll gimbal 45 and in erect mode feeds a signal through switch 65 and servo amplifier 66 to servo motor 67 to slave the gimbal 45 to the local vertical. The output of synchro 24, indicating the angular roll error between the vertical platform section and the outer roll gimbal 45, is combined with the roll offset signals on leads 62 and 63 (though velocity due to ground speed now may be zero) in the summing network 64 and fed via switch 53 and servo amplifier 37 to operate servo motor 22. This operates to slave the vertical platform section with the computed offset due to earth rate to the follow-up gimbal 45 which is now constrained to the local vertical by means of the bubble level.

Similarly, in pitch, the bubble level 103, which is secured to the follow-up pitch gimbal 46, feeds a signal through switch 82 (in the erect mode) and amplifier 84 to the servo motor 85 which thus rotates gimbal 46 in pitch until the bubble 103 is level and produces no output. Synchro 77 produces on lead 78 a signal indicative of the displacement in pitch of gimbal 46 relative to gimbal 21. This signal is combined with the correction signal proportional to the earth rate component of $\theta_y$ (assuming ground speed is now zero) in the summing network 79 and fed through switch 50 (in erect mode) and amplifier 51 to servo motor 52 which thus causes the vertical platform section to follow up the pitch gimbal 46 with the required pitch offset. The gimbal 46 is constrained to local level by means of the bubble level 103.

It is in this erection mode that it is necessary to substantially cage the vertical gyro to its platform section. Thus, the caging means such as 40 and 41 illustrated in FIG. 2 will prevent any substanial departure of the gyro from alignment with the platform section 11.

While any conventional means for initial azimuth alignment of the directional gyro may be employed, there is illustrated a conventional gyro compassing method which operates when switch 104a is thrown to the erect position thereof. In gyro compassing mode the output of caging amplifier 71, which is proportional to the X axis displacement between the gyro and its outer case 10 is fed through a gain control potentiometer 105 to be combined in summing network 98 with the earth rate compensation signal from amplifier 97. The output of summing network 98 is fed to the X axis torquer 99 to cause the gyro to precess in azimuth. When the gyro has precessed in azimuth to a position wherein its horizontal input axis is directly east-west, no earth rate component is sensed about this axis and the gyro is thus aligned in azimuth. The output of caging amplifier 71 in the process of gyro compassing is still applied to the Z axis torquer 72 to level the gyro about its horizontal input axis in response to the output of the X axis pickoff.

While the two gyros utilized are preferably two-axis gyros of the type illustrated in FIG. 2, it will be readily appreciated that other types of free gyros may be utilized in the system of this invention. For example, the system may employ free gyros having gas bearings of the type described in U.S. Patent No. 1,986,807 to Gillmor, and U.S. Patent No. 2,729,106 to Mathiesen.

Where the drift angle of the aircraft is available from instrumentation thereon, such as a Doppler unit, it is desirable and possible to correct the heading indication for such drift angle so as to provide an indication of the true vector velocity of the aircraft. Thus, when the drift angle signal is available, a three-phase synchro signal (indicated on line 109) from the drift angle synchro of the Doppler unit is also fed to the azimuth output synchro 74a which thus algebraically combines the drift angle with the heading as indicated by the azimuth gyro.

The several synchros and the interconnections are substantially conventional. Illustrated in FIG. 4 are the details of the servo system for slaving follow-up gimbal 45 to the vertical platform section with the required roll offset. Synchro 60 includes a rotor R60 secured to gimbal 45 and energized by a suitable source 108. The stator S60 of this synchro is mounted to the airframe and is electrically connected to the stator S24 of synchro 24. The latter has its stator fixed to inner gimbal 21 (and thereby secured in roll to gimbal 45) and has its rotor R24 secured to the vertical platform section 11. Thus, there is produced in the rotor R24 a signal indicative of the roll angle displacement of the gimbal 45 relative to the vertical gyro. This signal is fed through summing network 64 and amplifier 66 to servo motor 67, as previously described, so that (neglecting the offset $\theta_x$ at this time) both roll gimbal 45 and inner gimbal 21 are rotated by the servo motor until the roll gimbal 45 is aligned with the vertical platform. In this position, no signal is induced in rotor R24. With the application of the offset $\theta_x$ to summing network 64, gimbal 45 is rotated until it is at an angle with respect to the vertical gyro such that the signal induced in rotor R24 is equal and opposite to the computed correction $\theta_x$.

During the initial erection, the latitude dial 90 is set to the latitude of the takeoff position while the system is automatically erected by the bubble levels and aligned in azimuth. Immediately prior to takeoff, all of the switches are thrown to the operate position which removes the gyro compassing circuit from the azimuth gyro and places both gyros in the free gyro mode. The vertical platform section 11 is slaved to the vertical gyro while the follow-up gimbals 45 and 46 are caused to follow the vertical platform with the computed roll and pitch offsets. Thus, an accurately-levelled gimbal system is provided for mounting the azimuth gyro. Aircraft pitch and roll angle data are fed from the attitude reference to standard servo repeaters utilized in the display devices. These display devices will provide a level indication of suitable accuracy even during sustained accelerations of takeoff and landing. Indication of aircraft heading is presented from the azimuth gyro and may, if desired, also be fed to the autopilot to hold the aircraft on a preselected heading. As flight continues, it is necessary to change the latitude setting utilized in the computation of the offsets and vertical earth rate component. If this setting is changed periodically to correspond to the average latitude angle expected during a subsequent time interval, the aircraft path will slowly swing or oscillate about the desired path. The amplitude of such oscillation will be quite low. If greater accuracy is required, the latitude may be set more frequently or may be run continuously from a latitude computer.

It will be readily appreciated that where a heading reference is not desired, the directional gyro may be eliminated, thus cutting the length of the attitude reference substantially in half while still maintaining a simple and accurate vertical reference.

A basic advantage of the described method of providing vertical reference is that any temporary errors made in the calculation of the vertical gyro's offset components will not disturb the accuracy of the vertical gyro itself but will merely temporarily change the data presentation. This arrangement prevents the build-up of 84-minute oscillations in vertical gyro due to temporary errors such as those which might be introduced by deviations in the magnetic compass or use of periodic latitude values.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A vertical reference comprising: a gimballed platform, a Schuler-tuned vertical gyroscope mounted on said platform, a follow-up gimbal, platform velocity measuring equipment, means for constraining said platform to said gyroscope, and means responsive to said velocity measuring equipment for causing said gimbal to follow-up said platform with an offset proportional to the velocity measured by said velocity measuring equipment.

2. The structure of claim 1 wherein said follow-up means includes means for generating a position signal indicative of the attitude of said platform about a first axis, means for generating an offset signal substantially proportional to the quantity $$\frac{\Omega_e \cos \lambda \sin A}{\omega_o} + \frac{V_{GS}}{\omega_o R}$$

where the terms are as defined in the specification, and a servo motor responsive to the combination of said position and offset signals connected to pivot said follow-up gimbal.

3. A vertical reference comprising: a gimballed platform, a Schuler-tuned vertical gyroscope mounted on said platform, a follow-up gimbal, means for initially constraining said follow-up gimbal to a local level attitude and causing said platform to follow up said gimbal with an offset from local vertical proportional to platform velocity, switch means for disabling said initial constraint and follow-up, and means responsive to said switch means for constraining said platform to said gyroscope and causing said gimbal to follow up said platform with an offset from local vertical proportional to said platform velocity.

4. A vertical reference comprising a gimballed platform, a Schuler-tuned free vertical gyro mounted on said platform, a follow-up gimbal mounted for pivotal motion about a pair of mutually orthogonal substantially level axes, means for constraining said platform to said gyro, means for sensing attitude of said platform, means for computing the vector sum of earth rate and velocity of said platform relative to the earth, and servo means responsive to both said sensing and computing means for causing said gimbal to follow up said platform with an offset from local vertical proportional to said velocity.

5. A vertical reference comprising: a support, a pendulous free vertical gyroscope disposed at an offset angle relative to the vertical, said offset being a function of velocity of said support, gimbal means mounting said gyroscope to said support for pivotal motion about at least one horizontal axis, measuring means for measuring said support velocity, servo means responsive to said measuring means for causing said gimbal means to follow said gyroscope about said axis with an offset substantially equal in magnitude to said offset angle, and output means for indicating the attitude of said gimbal means relative to said support.

6. A vertical reference comprising: a support, a pendulous free vertical gyroscope disposed at an offset angle relative to the vertical, said offset being a function of velocity of said support, gimbal means mounting said gyroscope to said support for pivotal motion about at least one horizontal axis, measuring means for measuring said support velocity, servo means for causing said gimbal means to follow said gyroscope about said axis with an offset substantially equal in magnitude to said offset angle, output means for indicating the attitude of said gimbal means relative to said support, and an azimuth gyroscope mounted in said gimbal means and levelled thereby.

7. A vertical reference comprising: a support; a pendulous free vertical gyroscope disposed at an offset angle relative to the vertical, said offset being a function of velocity of said support; gimbal means mounting said gyroscope to said support for pivotal motion about at least one horizontal axis; velocity measuring means for measuring said support velocity; first servo means for causing said gimbal means to follow said gyroscope about said axis with an offset substantially equal in magnitude to said offset angle; output means for indicating the attitude of said gimbal means relative to said support; erecting means comprising level means for slaving said gimbal means to the local vertical and second servo means for causing said gyroscope to follow said gimbal means with an offset substantially equal in magnitude to velocity of said platform; and switch means for effecting mutually exclusive operation of said first servo means and said erecting means.

8. An attitude reference comprising: support means, a mechanically Schuler-tuned vertical gyroscope mounted upon said support means and providing a vertical reference offset from the local vertical by a predetermined function of velocity of said support means, means for sensing said velocity, means for generating correction signals in response to said sensing means indicative of said offset from vertical, an azimuth gyroscope, and means responsive to said vertical gyroscope and said correction signals for levelling said azimuth gyroscope.

9. An attitude reference comprising: a support, a mechanically Schuler-tuned vertical gyroscope providing a vertical reference offset from the local vertical by a predetermined function of velocity of said support, means for sensing said velocity, means for generating correction signals in response to said sensing means indicative of said offset from vertical, an azimuth gyroscope, means responsive to said vertical gyroscope and said correction signals for levelling said azimuth gyroscope, an output synchro coupled with said azimuth gyroscope, means for generating a signal representative of the vertical component of earth rate, a rate servo responsive to said last named signal, and means for driving said synchro in response to said rate servo.

10. In combination: a support; a vertical reference platform mounted for pivotal motion, relative to said support, about two mutually orthogonal axes; a free gyroscope mounted on said platform to have a vertical spin axis; means for unbalancing said spin axis to cause said gyroscope to have a natural period in the presence of horizontal acceleration to cause said gyro to be offset from the local vertical by an angle proportional to velocity of said support; means for slaving said platform to the vertical offset established by said gyroscope; pivotally mounted gimbal means; servo means for slaving said gimbal means to the vertical of said platform; velocity measuring means for measuring said support velocity; and means responsive to said measuring means for introducing an offset proportional to said velocity into said last-mentioned servo means to cause said gimbal means to follow said platform with an offset substantially equal to the offset of said gyroscope from local vertical.

11. In combination: a support; a vertical reference platform mounted for pivotal motion relative to said support about two mutually orthogonal axes; a free gyroscope mounted on said platform to have a vertical spin axis; means for unbalancing said spin axis to cause said gyroscope to have a natural period in the presence of horizontal acceleration to cause said gyroscope to be offset from the local vertical by an amount proportional to velocity of said platform; means for slaving said platform to the vertical offset established by said gyroscope; gimbal means pivotally mounted relative to said support; servo means for slaving said gimbal means to the vertical of said platform; velocity measuring means for measuring said support velocity; means responsive to said measuring means for introducing an offset proportional to velocity into said last-mentioned servo means to cause said gimbal means to follow said platform with an offset substantially equal to the offset of said gyroscope from local vertical; and an azimuth gyroscope mounted in said gimbal means and levelled thereby.

12. A vertical attitude reference comprising: a support; a platform mounted relative to said support for pivotal motion about first and second mutually orthogonal horizontal axes; gyroscope means on said platform for stabilizing said platform about said axes, said gyroscope means comprising a free gyroscope having a vertical spin axis unbalanced to provide said gyroscope with a natural Schuler period; a first follow-up gimbal pivotally mounted relative to said support about an axis parallel to said first axis; means for measuring the velocity of said support; follow-up means, responsive to said velocity measuring means, for slaving said follow-up gimbal to said platform with an offset indicative of a predetermined function of velocity of said support; a second follow-up gimbal pivotally mounted relative to said support about an axis parallel to said second axis; second follow-up means for slaving said second follow-up gimbal to said platform with an offset indicative of a second predetermined function of said velocity; an azimuth gyroscope; and means including said follow-up gimbals for levelling said azimuth gyroscope.

13. The structure of claim 12 wherein said first-mentioned follow-up means includes means for generating a position signal indicative of the attitude of said platform about said first axis, means for generating an offset signal substantially proportional to the quantity $$\frac{\Omega_e \cos \lambda \sin A}{\omega_0} + \frac{V_{GS}}{\omega_0 R}$$

where the terms are as defined in the specification, and a servo motor responsive to the combination of said position and offset signals connected to pivot said first follow-up gimbal.

14. The structure of claim 13 wherein said second follow-up means includes means for generating a second position signal indicative of attitude of said platform about said second axis, means for generating an offset signal substantially proportional to the quantity $$\frac{\Omega_e \cos \lambda \cos A}{\omega_0}$$

where the terms are as defined in the specification, and a servo motor responsive to the combination of said second position signal and said last-mentioned offset signal connected to pivot said second follow-up gimbal.

15. An attitude reference comprising: a case carrying a free gyroscope having an unbalanced vertical spin axis; a first gimbal mounting said case for pivotal motion about a first horizontal axis; a second gimbal mounting said first gimbal for pivotal motion about a second horizontal axis orthogonal to said first axis; a support; means mounting said second gimbal on said support for pivotal motion about a third axis in the same vertical plane as said first axis; servo means responsive to said gyroscope for slaving said case to said gyroscope about said first and second axes; means for sensing displacement of said second gimbal relative to said case about said first axis; velocity measuring means for measuring the horizontal velocity of said support; means for generating, in response to said measuring means, offset signal components indicative of the offset of said gyroscope from local vertical; servo means responsive to said sensing means and to a first component of said offset signal component generating means for controlling said second gimbal about said first axis; a third gimbal mounted on said second gimbal for pivotal motion about a third axis parallel to said second axis; means for sensing relative displacement of said first and third gimbals about said parallel axes; servo means responsive to said last-mentioned sensing means and to a second component of said offset signal component generating means for controlling said third gimbal about said third axis; azimuth gyroscope means mounted in said third gimbal; and output means for indicating level defined by said first and third gimbals and for indicating azimuth defined by said azimuth gyroscope means.

16. In combination: a supporting vehicle having a roll, pitch, and yaw axis; a first gimbal mounted upon said supporting vehicle for angular motion about a first axis parallel to said roll axis; a second gimbal mounted relative to said first gimbal upon a second axis in the plane of said gimbal and perpendicular to said first axis; a third gimbal mounted upon said second gimbal for rotation about a third axis in the plane of said second gimbal and perpendicular to said second axis; the wheel of a pendulous vertical gyroscope mounted upon said third gimbal for angular freedom about said second and third axes; a fourth gimbal mounted upon said first gimbal for rotation about a fourth axis parallel to said second axis and in the plane of said first gimbal; an azimuth gyroscope case containing an azimuth gyroscope mounted upon said fourth gimbal for rotation about a fifth axis in the plane of said fourth gimbal and perpendicular to said fourth axis; means for erecting said vertical gyroscope and said azimuth gyroscope; means for measuring the horizontal velocity of said vehicle; means for measuring the drift angle of said vehicle; means for causing said first gimbal to follow the rotations of said third gimbal about said third axis; means for offsetting the rotation of said first gimbal from the rotation of said third gimbal by a factor $$\frac{\Omega_e \cos \lambda \sin A}{\omega_0} + \frac{V_{GS}}{\omega_0 R}$$

where the terms are defined in the specification; means for causing said second gimbal to follow said vertical gyroscope about said second axis; means for generating a signal which is a measure of the difference in the angle between said first and second gimbals and the angle between said first and fourth gimbals, said difference angle being a measure of the angle between the vertical axis of said vertical gyroscope and said fifth axis; means for modifying said last named difference signal by the factor $$\frac{\Omega_e \cos \lambda \cos A}{\omega_o}$$

where the terms are defined in the specification; and means for rotating said fourth gimbal about said fourth axis in response to said last named modified signal.

17. A device as recited in claim 16 in which said velocity measuring means and said means for measuring the drift angle of said vehicle is a Doppler unit and in which the angle A is determined by a magnetic compass means; and further comprising means responsive to the angular position of said azimuth gyroscope case relative to said fourth gimbal about said fifth axis to generate a signal which is a measure of the azimuth of said vehicle; means responsive to the angle between said first and fourth gimbals about said fourth axis to generate a signal which is a measure of the pitch of said supporting vehicle; means responsive to the angular position of said first gimbal relative to said supporting vehicle about said first axis to generate a signal which is a measure of the roll of said supporting vehicle; and means for displaying said roll, pitch, and azimuth signals.

References Cited by the Examiner
UNITED STATES PATENTS

| | | | |
|---|---|---|---|
| 1,932,210 | 10/33 | Glitscher | 74—5.34 |
| 2,501,885 | 3/50 | Barnes et al. | 74—5.44 |
| 2,728,233 | 12/55 | Fowler | 74—5.41 |
| 2,771,779 | 11/56 | Schaffer et al. | 74—5.34 |
| 2,809,528 | 10/57 | Serson | 74—5 X |
| 2,835,132 | 5/58 | Vacquier | 74—5.47 |
| 2,879,669 | 3/59 | Statsinger | 74—5.4 X |

BROUGHTON G. DURHAM, *Primary Examiner.*